Sept. 15, 1970 L. T. BRINSON 3,528,265
VISCOUS DAMPENING MEANS
Filed Sept. 16, 1968 2 Sheets-Sheet 1
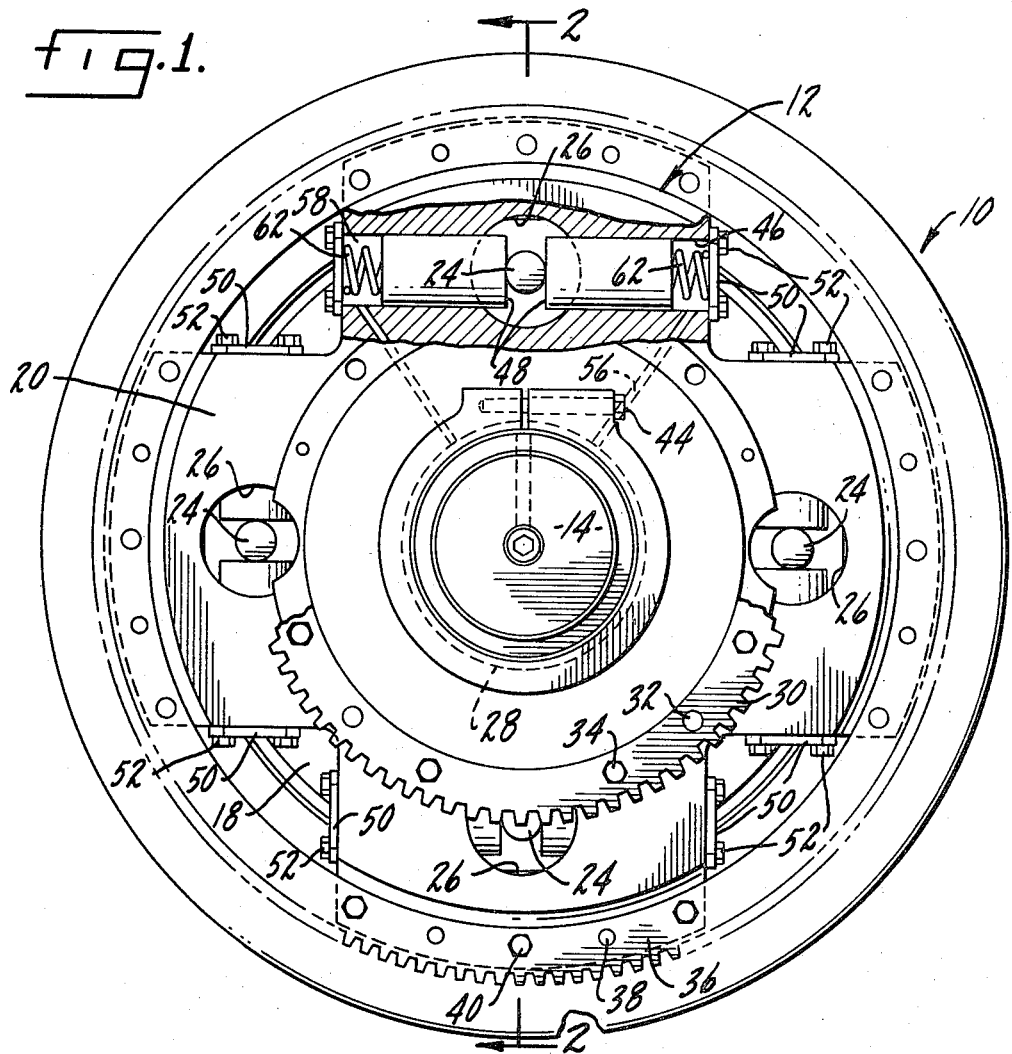
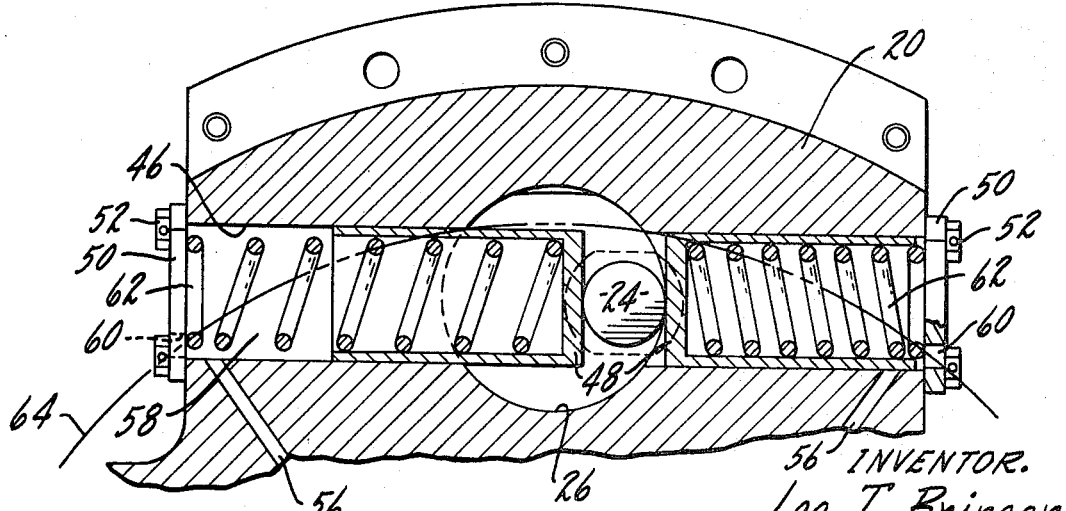
INVENTOR.
Leo T. Brinson
BY Parker, Carter & Markey
Attorneys.

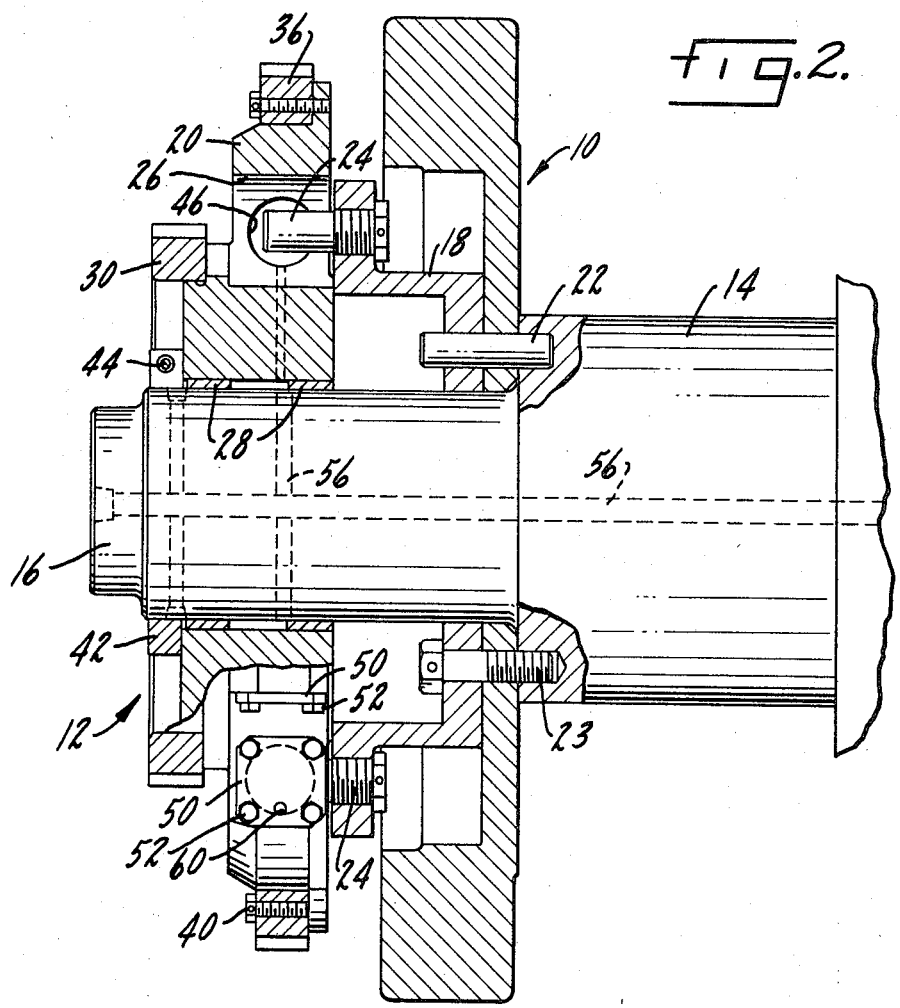
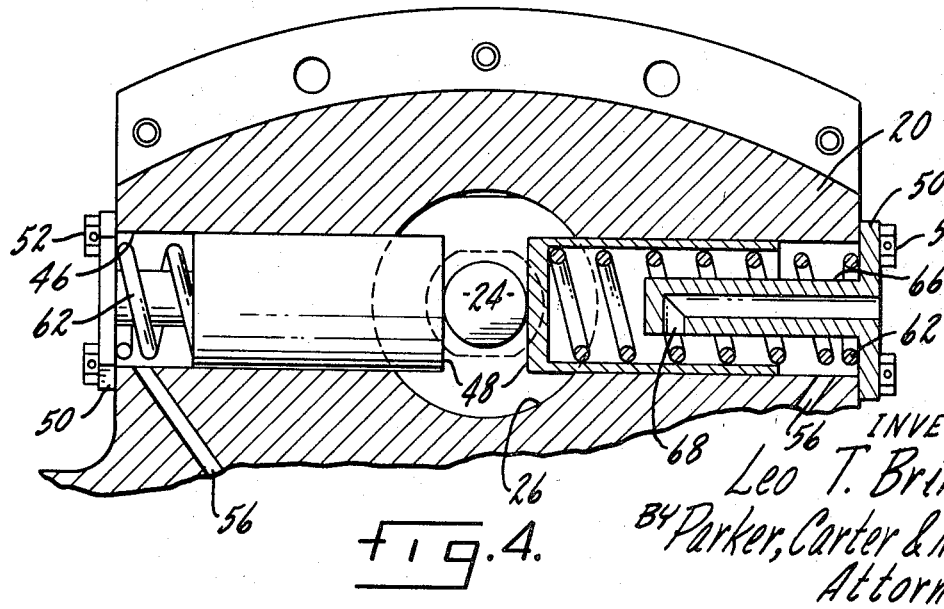

United States Patent Office 3,528,265
Patented Sept. 15, 1970

3,528,265
VISCOUS DAMPENING MEANS
Leo T. Brinson, Milwaukee, Wis., assignor to Nordberg Mfg. Company, Milwaukee, Wis., a corporation of Wisconsin
Filed Sept. 16, 1968, Ser. No. 760,277
Int. Cl. F16d 3/80, 3/14; F16f 15/16
U.S. Cl. 64—26                                    10 Claims

ABSTRACT OF THE DISCLOSURE

A viscous dampening means operable within a coupling mechanism adapted to reduce and absorb vibratory motion in a drive shaft including at least one cylindrical opening each having a pair of similar, oppositely disposed pistons therein, each piston being spring-biased inwardly for slidably receiving a connecting pin therebetween. In addition there is a passage means leading to at least one chamber formed by the walls of the cylindrical opening and pistons for introducing a viscous fluid therein, an outlet in each chamber for discharging a measured amount of fluid, and a means for controlling the amount of fluid in each chamber.

SUMMARY OF THE INVENTION

This invention relates to a viscous dampening means for use in a coupling mechanism for a drive shaft and more particularly, to a viscous dampening means for effectively absorbing and reducing oscillations in the drive shaft.

Accordingly, a primary object of this invention is a viscous dampening means that is applicable to a drive shaft for reducing the magnification of vibration and absorbing the shock of operation.

A further object is an improved dampening means that provides a cushioning effect in the coupling mechanism to relieve the various parts of running strain and prevent excessive wear.

Another object is a viscous dampening means that reduces the torsional vibration in the drive shaft so that auxiliary equipment such as pumps may receive a substantially uniform drive.

Another object is an improved dampening means that provides a viscous dampening effect by forcing a fluid in a chamber out a small outlet.

Other objects and advantages will be apparent from the ensuing specification and drawings for this invention.

BRIEF DESCRIPTION OF THE DRAWINGS

The invention is illustrated by the accompanying drawings wherein:

FIG. 1 is a front view of the coupling mechanism with parts broken away and in section;

FIG. 2 is a section view taken along line 2—2 of FIG. 1;

FIG. 3 is an enlarged partial section view showing the viscous dampening means in more detail, and FIG. 4 is an enlarged partial section view showing another form of the viscous dampening means.

DESCRIPTION OF THE PREFERRED EMBODIMENTS

Referring to the drawings in more detail it will be seen that this invention consists of a viscous dampening means 10 operable within a coupling mechanism 12 for a drive shaft 14 of an engine. The viscous dampening means 10 provides a flexible coupling that reduces and absorbs vibratory motion in the drive shaft 14'. This invention allows the free end of the drive shaft or crankshaft to operate auxiliary equipment such as water pumps or lubrication oil pumps at a substantially uniform drive and speed.

As shown in FIGS. 1 and 2 the coupling mechanism 12 is journaled to a hub 16 of the drive shaft 14. The coupling mechanism consists of two plates, one being a driving plate 18 and the other a driven plate 20. It should be understood that these plates 18 and 20 may be reversed and the driving plate act as the driven plate while the driven plate acts as the driving plate.

The driving plate 18 is preferably connected to the drive shaft by dowels 22 and cap screws 23. A connecting pin or driving lug 24 is securely fastened to and extends through the driving plate 18 into a slot 26 in the driven plate. The driven plate 20 acts as a flexible drive body and is preferably separated from the hub 16 of the drive shaft by a pair of bushings 28.

A lubrication oil pump drive gear 30 may be fastened to the flexible drive body 20 by a plurality of dowels 32 and cap screws 34. A water pump drive gear 36 which may or may not have the same pitch diameter may also be fastened to the flexible drive body 20 by a plurality of dowels 38 and cap screws 40.

Although FIGS. 1 and 2 show two take-offs for auxiliary equipment either one uniform take-off or more than two take-offs, all of different diameters, may be employed if it is desired to operate the equipment at either equal speeds or a plurality of different drive speeds.

A clamp ring 42 secured by an appropriate fastener such as the cap screw 44 holds the coupling mechanism 12 securely on the hub 16 of the drive shaft.

The viscous dampening means 10 has at least one opening 46 within the coupling mechanism 12. FIGS. 1 and 2 show this invention as containing two pairs of opposite disposed openings 46 each mounted at equal distances apart within the flexible drive body 20. As the structure of each opening 46 is identical, a description of one will serve for an understanding of all and it will be evident that the number of openings will depend on the number of connecting pins 24 it is desired to utilize.

The connecting pin or driving lug 24 which projects into the driven plate feeds through a slot 26 between two oppositely disposed pistons 48. Cover plates or spring retaining plates 50 are secured by appropriate fasteners such as cap screws 52 to the flexible drive body. The pistons 48 are spring biased inwardly and are free to move laterally.

The movement of the pistons 48 is restricted by a viscous fluid within the opening 46 that dampens the oscillations and vibrations in the drive shaft 14. The viscous fluid may originate from the lubrication oil system and preferably is transported through passage means 56 leading to chambers 58 formed by the walls of the opening 46 and pistons 48. As the pistons fluctuate from side to side in response to impulses from explosion in the engine a measured amount of fluid will be discharged from the chambers 58 through an outlet 60 in the cover plates 50.

FIG. 3 shows one embodiment of the viscous dampening means 10 in more detail. The connecting pin 24 fits into a slot 26 in the flexible drive body and floats between two pistons 48 moving laterally in the opening 46. Each piston 48, on opposite sides of the connecting pin 24, is actuated inwardly by springs 62 bearing against the cover plates 50 which form the enclosure for each chamber 58. The springs 62 exert equal pressure against each piston 48 and under normal conditions serve to maintain the connecting pin 24 in a centralized or balanced position. The connecting pin in FIG. 3, however, is shown in a loaded position and has therefore moved to the right hand edge of the slot 26.

To further aid in proper positioning of the pistons 48, use is made of a viscous fluid introducible under pressure into the opening 46 through the passage means 56. The level of the viscous fluid in each chamber 58 is controlled by the location of the outlets 60. As the drive shaft 14 turns, the centrifugal force will cause the fluid to move away from the rotational center of the coupling mechanism 12. The centrifugal force will cause the fluid to describe an arc indicated at 64 and will maintain the fluid at this level at all times. In other words the radius of the arc 64 of the fluid is controlled by the radial distance the outlets 60 are from the center of the coupling mechanism 12.

In addition the outlets 60 are disposed so that the fluid may escape without building up undue pressures. For this reason the size of the outlet opening is important as it controls the rate of the escaping fluid.

FIG. 4 discloses another embodiment of this invention wherein the cover plates 50 have a center post 66 with an outlet passage 68. In this manner the amount of fluid in each chamber may be controlled by the location of the passage outlets 68 in each center post.

The use, operation and function of this invention are as follows:

When the frequency of operation approaches or is close to resonant frequency the amplitude of vibration will increase and eventually may break various parts in the mechanism. This is particularly true when the engine speed is reduced as the lower frequencies of operation are much harder to isolate. The viscous dampening means 10 described in this application acts like a shock absorber and eliminates all of these problems. This invention provides a flexible coupling for reducing and absorbing torsional vibrations in the drive shaft 14 so that auxiliary equipment, such as fuel pumps and water pumps, receives a substantially uniform drive.

The connecting pin 24 is in the center of the slot 26 when each spring 62 is under an equal amount of load. When the auxiliary equipment puts a load on the drive shaft, or the fluctuations in the drive shaft are great enough, the connecting pin 24 will move laterally to either the right or left. Assuming the connecting pin 24 moves to the right as shown in FIG. 3, then the spring on the right will be depressed and the spring on the left will be extended. Consequently, the volume of the right hand chamber will be reduced and the viscous fluid will be forced out the small outlet 60. This action has a dampening effect. In addition each chamber 58 contains a certain amount of air which acts as a buffer to reduce any mechanical impact caused by the lateral movement of the pistons 48 and springs 62.

Shortly after the connecting pin 24 has moved to the right additional fluid will be needed in the right hand chamber to replenish the supply of fluid lost in that chamber when the fluid was forced out the outlet 60 by the sliding connecting pin. The combined action of the increase in pressure in the right hand chamber from the incoming fluid and the tendency of the right hand spring to expand will correspondingly shift the connecting pin 24 back to its neutral position as shown in FIG. 4.

I claim:

1. For use with a drive shaft for an engine, a viscous dampening means operable within a coupling mechanism having at least one connecting pin between a driving plate and a driven plate, said viscous dampening means including at least one opening each having a pair of similar oppositely disposed pistons therein, each piston being spring-biased inwardly for slidably receiving said connecting pin therebetween, a passage means leading to at least one chamber formed by the walls of the opening and pistons for introducing a viscous fluid therein, an outlet in each chamber for discharging a measured amount of viscous fluid, and a means for controlling the amount of fluid in each chamber for reducing and absorbing vibratory motion in the drive shaft.

2. The structure of claim 1 further characterized in that the coupling mechanism is flexible and provides a substantially uniform drive for auxiliary equipment operating off the drive shaft.

3. The structure of claim 1 further characterized in that the connecting pin is driven by the drive shaft.

4. The structure of claim 1 further characterized in that the connecting pin projects from the driving plate to the driven plate feeding through a slot between the pair of oppositely disposed pistons.

5. The structure of claim 1 further characterized by a pair of springs urging the pistons and connecting pin into a balanced position.

6. The structure of claim 5 further characterized in that each spring rests up against a cover plate and each cover plate contains a center post having an outlet passage.

7. The structure of claim 1 further characterized in that the connecting pin is adapted to float within a slot in the driven plate forcing a measured amount of viscous fluid out of the chamber when the connecting pin moves laterally.

8. The structure of claim 1 further characterized in that the viscous fluid is a viscous oil traveling under pressure from the engine lubrication system through a passage means to the chambers in each opening.

9. The structure of claim 1 further characterized in that the centrifugal force in each chamber causes the viscous fluid to be trapped in the portion of the chamber beyond a radial arc passing through the outlet and further the trapped viscous fluid acts as an additional cushion for reducing and absorbing vibratory motion in the drive shaft.

10. The structure of claim 9 further characterized in that the portion of the chamber running full of a viscous fluid due to centrifugal force can be controlled by the radial distance the outlet is from the rotational center of the drive shaft.

References Cited

UNITED STATES PATENTS 1,392,902  10/1921  Adamson _____ 64—26

FOREIGN PATENTS 954,694  4/1964  Great Britain.

JAMES A. WONG, Primary Examiner

U.S. Cl. X.R.

64—27; 74—574